United States Patent [19]

Schall

[11] Patent Number: 5,802,095
[45] Date of Patent: Sep. 1, 1998

[54] OXYGEN-IODINE LASER

[75] Inventor: Wolfgang Schall, Waldenbuch, Germany

[73] Assignee: Deutsche Forschungsanstalt Fuer Luft-und Raumfahrt e.V., Germany

[21] Appl. No.: 663,357

[22] Filed: Jun. 13, 1996

[30] Foreign Application Priority Data

Jun. 14, 1995 [DE] Germany .................. 195 21 688.1

[51] Int. Cl.$^6$ ........................................... H01S 3/095
[52] U.S. Cl. ......................... 372/89; 372/90; 372/98; 372/59
[58] Field of Search ..................... 372/89, 90, 55, 372/58, 59, 98

[56] References Cited

U.S. PATENT DOCUMENTS

| | | | |
|---|---|---|---|
| 3,992,685 | 11/1976 | Ogren et al. | 372/55 |
| 4,514,698 | 4/1985 | Blumenthal et al. | 372/59 |
| 4,653,062 | 3/1987 | Davis | 372/89 |
| 4,787,091 | 11/1988 | Wagner | 372/89 |
| 5,229,100 | 7/1993 | Harpole | 372/55 |
| 5,289,488 | 2/1994 | Wegmann | 372/55 |
| 5,301,203 | 4/1994 | Schlie et al. | 372/55 |
| 5,425,044 | 6/1995 | Schlie et al. | 372/55 |

OTHER PUBLICATIONS

H. Fujii, et al.: Development of high–power chemical oxygen–iodine laser for industrial application, J. Appl. Phys. 67(9), May 1, 1990, pp. 3948–3953.

H. Fujii, et al.: Long–term stability in the operation of a chemical oxygen–iodine laser for industrial use, J. Appl. Phys. 66(3), Aug. 1, 1989; pp. 1033–1037.

D. Pigache, et al.: Theoretical and experimental analysis of a Chemical Oxygen Iodine Laser, SPIE vol. 1810 Gas Flow and Chemical Lasers (1992), pp. 528–531.

H. Fujii, et al.: Development of chemical oxygen–iodine laser for industrial application, Proceedings of the International Symposium on GCL, SPIE, Madrid 1990, 7 pages.

*Primary Examiner*—Leon Scott, Jr.
*Attorney, Agent, or Firm*—Barry R. Lipsitz; Ralph F. Hoppin

[57] ABSTRACT

In order to improve an oxygen-iodine laser comprising a reaction unit for the generation of a gas stream composed of excited oxygen by chemical reaction between a reaction liquid and a reaction gas, a steam trap with a condensation chamber, in which steam entrained by the gas stream is condensed onto cold surfaces, an iodine injector, which injects iodine into the gas stream to generate a laser-active gas mixture, and a laser resonator with the laser-active gas mixture flowing through it, in such a way as to obtain a gas stream as free from steam as possible using the simplest possible means, it is proposed that the cold surfaces for separation of the steam are formed by liquid surfaces of a condensation liquid moved in the condensation chamber.

25 Claims, 6 Drawing Sheets

OXYGEN-IODINE LASER

BACKGROUND OF THE INVENTION

The invention relates to an oxygen-iodine laser comprising a reaction unit for the generation of a gas-stream composed of excited oxygen by chemical reaction between a reaction liquid and a reaction gas, a steam trap with a condensation chamber, in which stream entrained by the gas stream is condensed onto cold surfaces, an iodine injector, which injects iodine into the gas stream to generate a laser-active gas mixture, and a laser resonator with the laser-active gas mixture flowing through it.

Such an oxygen-iodine laser is known from the article by Hiroo Fujii, Masahiro Iizuka, Mikio Muro, Hirotsuna Kuchiki and Toshio Atsuta entitled "Development of Chemical Oxygen-Iodine Laser for Industrial Application" SPIE, Vol. 1397, Eight Int. Symp. on Gas Flow and Chemical Lasers (1990), page 213, J. M. Orza, C. Domingo, Editors, published by SPIE—The Intern. Soc. for Opt. Eng., Bellingham, Wash. 98 227-0010, USA.

In such an oxygen-iodine laser, the steam trap has discs which are cooled from their inside and on which steam is deposited on their outer surface in the form of ice, and this ice is then scraped from the discs continuously during operation.

Such a solution has the disadvantage that this is of mechanically complex and expensive construction and moreover the ice may either be only scraped away incompletely from the surface of the discs, thus impairing the condensation effect, or scraping must be carried out using mechanically complex and expensive means.

SUMMARY OF THE INVENTION

Therefore the object of the invention is to improve an oxygen-iodine laser of this specific type in such a way as to obtain a gas stream which is as free from steam as possible using the simplest possible means.

This object is achieved according to the invention with an oxygen-iodine laser of the aforementioned type in that the cold surfaces for separation of the steam are formed by surfaces of a condensation liquid moved in the condensation chamber.

The advantage of the solution according to the invention is that because the steam is separated on a liquid surface instead of a physical surface, there is the advantage that the steam is no longer present in the form of ice, but is absorbed by the liquid and may thus be simply removed from the condensation chamber with the liquid, and as a result an optimum thermal contact between the gas stream and the liquid surface is in turn always possible which is in no way impaired by the already condensed steam.

Fundamentally, the condensation liquid may in this case move in the condensation chamber in a wide variety of ways. For example, it is conceivable to move the condensation liquid mechanically, for example, as a result of this forming a liquid film on a mechanically moved element, e.g. a disc.

However, it is particularly advantageous if the condensation liquid moves in the condensation chamber in the form of a flow, since the formation of a flow of condensation liquid may be achieved particularly easily, and therefore the measures necessary for a mechanically moved part and the problems thereof may be put aside.

In order to optimise as far as possible the exchange between the steam entrained by the gas stream and the condensation liquid, it is particularly advantageous if the condensation liquid moves relatively to the gas stream through the condensation chamber. As a result of this, a constant exchange of condensation liquid interacting with the gas stream is possible, so that this is not changed through the interaction with the gas stream and thus in turn allows condensation of the steam to be optimised as far as possible.

A very wide variety of solutions are conceivable to allow the condensation liquid to flow through the condensation chamber.

Hence, it is possible, for example, to move the condensation liquid through the condensation chamber in the form of drops. In this case, the drops are preferably substantially equal in size and in particular are sufficiently large so as not to be entrained by the gas stream passing through the condensation chamber.

As an alternative thereto, an advantageous embodiment provides that the condensation liquid flows through the condensation chamber in the form of several liquid jets.

The liquid jets may, in principle, be formed so that they move initially coherently after formation, but then separate and form individual drops or droplets. However, it is particularly advantageous if the liquid jets flow through the condensation chamber in the form of coherent jets, since the formation of drops or droplets is then suppressed and therefore there is also little possibility of the gas stream entraining the condensation liquid when flowing through the condensation chamber.

Prevention of this entrainment of droplets of condensation liquid may then be optimised in particular if the condensation liquid is guided through the condensation chamber without formation of droplets. This means that no drops or droplets whatsoever are formed even on separation of the liquid jets.

In this case, the liquid jets are preferably formed so that they have a thickness of at least approximately 1 mm, thus ensuring that they move over the required path length through the condensation chamber in the form of coherent liquid jets.

As an alternative or supplementary to the possibility of liquid jets running freely through the condensation chamber, a further advantageous embodiment provides that the condensation liquid flows in the form of a liquid film over wall surfaces in the condensation chamber and is guided by these. Such wall surfaces for guiding a liquid film allow this film to be positioned at defined locations in the condensation film, and moreover these wall surfaces enable the liquid film to be held at the very same point, for example, in spite of changing flow rate of the gas stream.

In this case, the wall surfaces are preferably constructed so that they form spaces through which the gas stream passes.

The wall surfaces may be formed by a wide variety of bodies. For example, it would be conceivable for the wall surfaces to be simply formed by housing wall surfaces covered by a liquid film.

However, it is even more advantageous if the wall surfaces are formed by guide elements, over which the condensation liquid flows, for example, or which are movable covered with condensation liquid.

No further details have been given thus far with respect to the arrangement of the surfaces of the condensation liquid in the condensation chamber in association with the previous explanation of the individual embodiments. Hence, an advantageous solution provides that the surfaces of the condensation liquid are arranged in at least one row and in particular in mutually spaced relationship. It is even more advantageous if several consecutive rows are spaced from one another. In this case, it is particularly expedient if consecutive rows spaced from one another have surfaces of the condensation liquid staggered in relation to one another.

No further details have been given thus far with respect to the arrangement of the condensation chamber of the steam trap itself in association with the previous explanation of the embodiments. Hence, an advantageous embodiment provides that the condensation chamber is arranged in a discharge duct of the reaction unit provided for the gas stream.

This solution has the great advantage that the volume of the condensation chamber may be kept as small as possible and therefore the possibility of the excited oxygen being deactivated in the reaction chamber is kept very low.

Moreover, it is particularly advantageous here if the condensation chamber is arranged as close as possible to the reaction chamber. It is particularly expedient if the condensation chamber essentially directly adjoins the reaction chamber.

No further details have been given thus far with respect to the guidance of the condensation liquid after it has been moved through the condensation chamber. Hence, it would be conceivable, for example, to take the condensation liquid from a container and collect it again in a second container, then regenerate it and transfer it back into the first container.

However, it is particularly advantageous if the condensation liquid passes through a circulation system.

In this case, the circuit is expediently fitted with a cooling system for cooling the condensation liquid to an optimum temperature for condensation of the steam.

Moreover, a separator for water from the condensation liquid is also provided in the circulation system to provide the possibility of removing the condensed water transported by this from the condensation liquid again.

A particularly advantageous solution provides that the condensation liquid is formed by the reaction liquid of the reaction unit.

This solution has the great advantage that the preparation still required in the case of the reaction liquid, both with respect to its composition and its temperature, may also be utilised for use of the same liquid in the steam trap.

A particularly advantageous embodiment in this case provides that the reaction liquid is removed from the reaction unit and fed to a preparation unit, and the prepared reaction liquid is then fed to the steam trap for use as condensation liquid in same.

Moreover, it is particularly simple in this case if the reaction liquid acting as condensation liquid in the steam trap enters the reaction unit after passing through the steam trap.

In this case, it is also preferably provided that the reaction liquid exits from the reaction unit and enters a preparation unit.

To ensure that the oxygen in the steam trap is deactivated as little as possible, it is preferably provided that the ratio of the active cold surfaces to the volume in the steam trap is lower than the ratio of the active surface to the volume in the reaction unit, so that while separation of the steam from the gas stream occurs as favourably as possible, deactivation of the oxygen is, however, prevented as far as possible because of the large volume of the steam trap.

In addition, the volume of the condensation chamber is advantageously less than approximately one third of the volume of the reaction chamber.

No further details have been given thus far with respect to the structure of the reaction unit in association with the previous explanation of the individual embodiments. Hence, an advantageous embodiment provides that the reaction unit is constructed as a so-called bubble generator, in which the reaction gas passes through the reaction liquid in the form of bubbles and the chemical reaction of the reaction gas with the reaction liquid occurs on the interfaces between the bubbles and the reaction liquid.

As an alternative thereto, it is provided in a particularly advantageous embodiment that the reaction unit is constructed as a so-called disc generator, in which reaction discs are wetted with reaction liquid in a bath and then the flow of the reaction was is circulated around these wetted discs so that the chemical reaction occurs on the wetted discs at the liquid surface of the reaction liquid.

It is particularly advantageous if the reaction unit used is a reaction unit constructed in accordance with the German patent application P 44 42 463.9.

Further features and advantages of the invention are the subject of the following description and also of the drawings illustrating some embodiments.

DETAILED DESCRIPTION OF THE INVENTION

Figure 1:
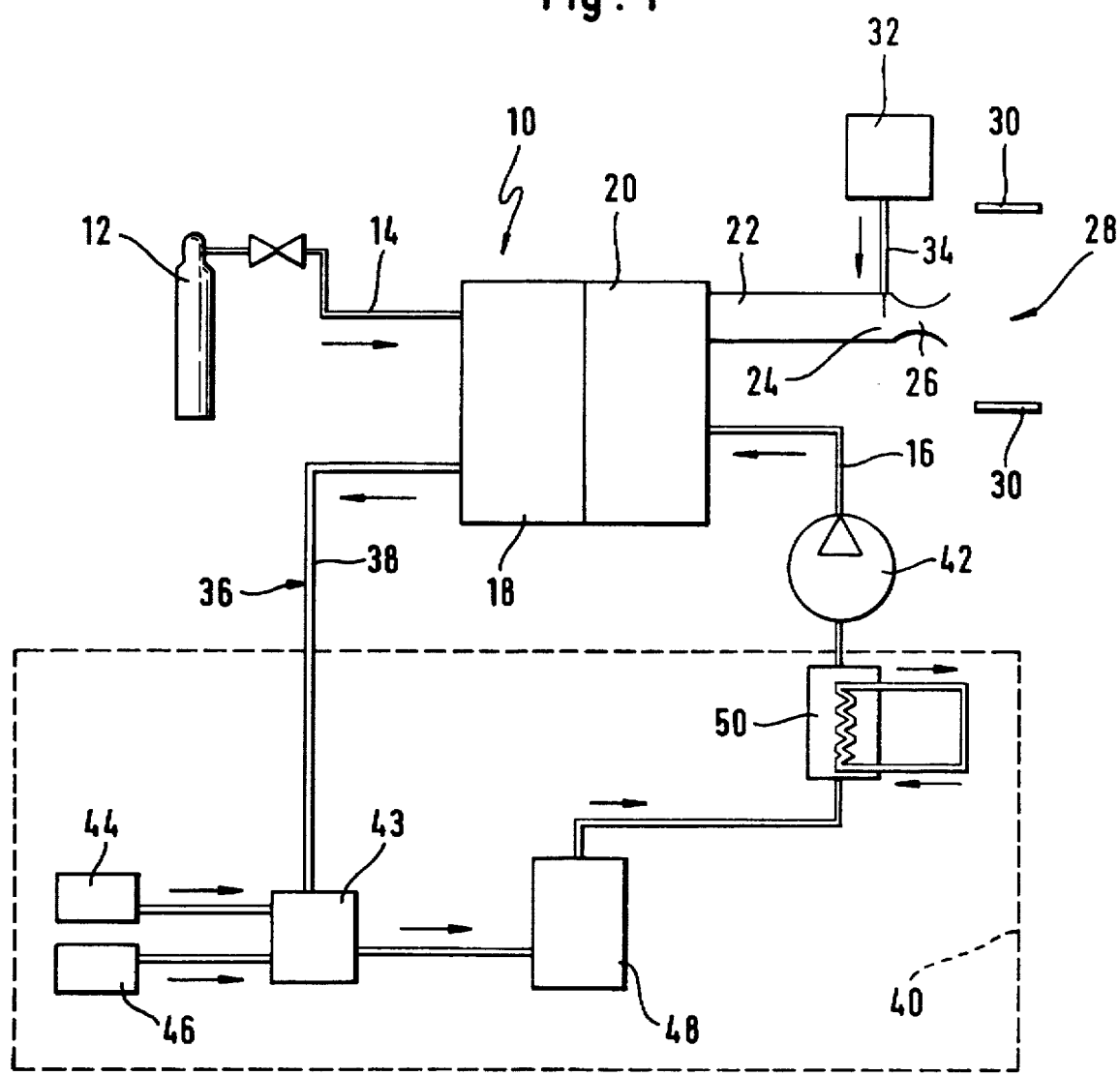
FIG. 1 is a schematic representation of an oxygen-iodine laser according to the invention.

A chemical oxygen-iodine laser according to the invention comprises an oxygen generator, given the overall reference 10, for the generation of electronically excited oxygen by chemical reaction between chlorine gas, which is stored in a storage container 12 and is fed to the oxygen generator 10 via a pipe 14, and a reaction liquid, which is fed to the oxygen generator via a pipe 16.

The gaseous chlorine and the reaction liquid, preferably basic peroxide solution (BHP), then react in a reaction unit 18 forming excited oxygen, from which steam formed during the oxygen formation is then removed in a steam trap 20 of the oxygen generator 10. The excited oxygen then flows out of the oxygen generator 10 via a flow channel 22 into an iodine injector 24 and then through an ultrasonic nozzle 26 into a laser resonator 28 formed by a set of mirrors 30.

The iodine added to the excited oxygen in the iodine injector 24 is generated in an iodine steam generator 32 and fed to the iodine injector 24 via a pipe 34.

The reaction liquid flowing into the oxygen generator 10 is circulated in a reaction liquid circulation system, given the overall reference 36, this reaction liquid circulation system 36 comprising the feed pipe 16 to the oxygen generator 10, a discharge pipe 38 directed out of the oxygen generator 10, a preparation unit 40 and a circulation pump 42.

A mixing container 43 is preferably provided in the preparation unit 40, in which caustic potash solution or also soda lye, for example, may be fed from a storage container 44 for caustic solutions and hydrogen peroxide may be fed from a hydrogen peroxide storage container 46 for regeneration of the reaction liquid. The preparation unit 40 additionally comprises a separator 48 for separation of the potassium chloride and water from the reaction liquid. A heat exchanger 50 is also provided in the preparation unit 40 to cool the reaction liquid.

Figure 2:
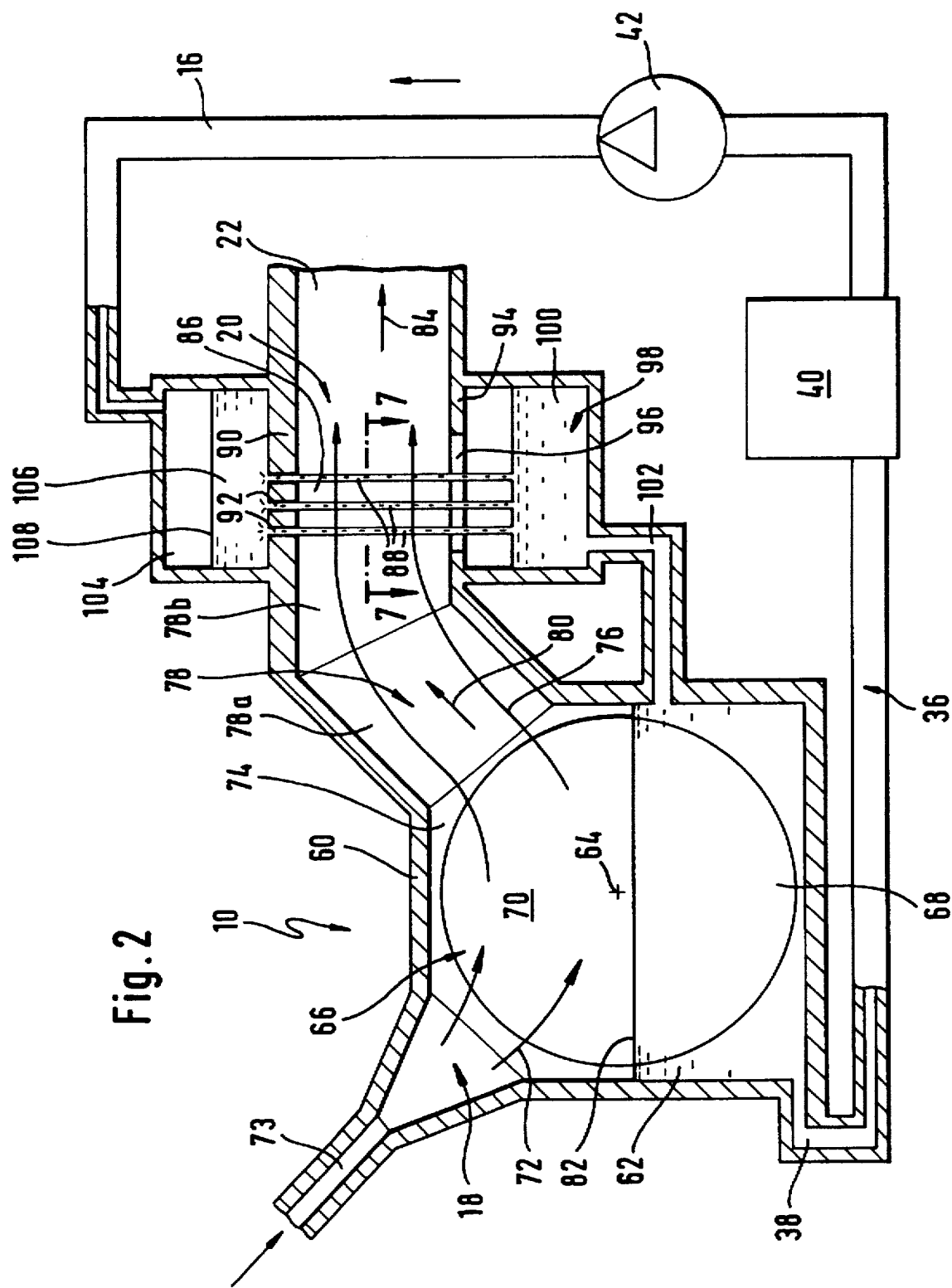
FIG. 2 is a schematic representation of a first embodiment of an oxygen generator in longitudinal section.

As shown in FIG. 2, a first embodiment of an oxygen generator 10 according to the invention comprises a housing 60 for the reaction unit, in the lower region of which a bath 62 of reaction liquid stands. Several reaction discs 66 rotatable around a common axis 64 plunge into this bath 62 with their respective lower half 68, whilst an upper half 70 of the reaction discs 66 is flushed with reaction liquid from the bath 62 wetted by a chlorine gas stream 72 which flows into the housing 60 via an inlet 73 connected to the pipe 14. The chlorine gas stream 72 reacts with the reaction liquid present on the top halves 70 of the reaction discs 66 forming potassium chloride separated in the liquid and releasing gaseous excited oxygen in a reaction chamber 74, which is located above the bath 62, is enclosed by the housing 60 and has the upper halves 68 of the reaction discs 66 passing through it.

In this case a gas stream 76 comprising the excited oxygen which enters the flow channel 22 via a discharge duct 78 is formed in the reaction chamber 74.

As shown in FIG. 2, with a first section 78a directly adjoining the reaction chamber 74, the discharge duct 78 firstly extends in a direction 80 pointing away from the bath 62 and encloses an angle of at least 30° with a surface of the bath 62.

Adjoining the first section 78a, the discharge duct 78 then already extends with a second section 78b parallel to the direction 84 of the flow channel 22 and then merges into same.

The section 78b of the discharge duct 78 itself forms a condensation chamber 86 which has liquid jets 88 of a condensation liquid passing through it, said liquid jets 88 running transversely to the direction 84 along which the gas stream 76 comprising the excited oxygen flows in section 78b.

For formation of the liquid jets 88, an upper wall 90 of the discharge duct 78 is preferably provided in section 78b with a plurality of nozzle openings 92 from which the liquid jets 88 then exit. Opposite the nozzle openings 92 a lower wall 94 of the discharge duct 78 is provided with an opening 96 through which all the liquid jets 88 themselves pass and enter a collecting basin 98 located below the lower wall 94. In this case, a bath 100 of the condensation liquid preferably formed in the collecting basin 98, said condensation liquid passing from the bath 100 via a feed duct 102 into the bath 62.

For delivery of condensation liquid to the nozzle openings 92, a storage container, given the overall reference 104, is arranged above these, and a bath 106 of condensation liquid located above the nozzle openings 92 is formed in said storage container, the pressure of the condensation liquid flowing through the nozzle openings 92 being adjustable in this case.

The feed pipe 16 of the circuit 36 for the reaction liquid already described in association with FIG. 1 now feeds into this storage container 104.

The reaction liquid is discharged out of the bath 62 via the discharge pipe 38 through the circuit 36, in which case the reaction liquid contains the reaction products formed during the reaction in the reaction chamber 74: potassium chloride and water, and is additionally heated as a result of the heat released during the chemical reaction.

This reaction liquid is prepared in the preparation unit 40, in which case by maintaining the concentration of hydrogen peroxide and KOH on the one hand these are added in the mixing chamber 42, potassium chloride and water are additionally separated in the separator 48 and the reaction liquid is then cooled in the heat exchanger 50. The reaction liquid is fed by the pump 42 into the bath 106 in the storage container 104 via the feed pipe 16 and as a result of the nozzle openings 92 passes through the condensation chamber 86 in the form of the liquid jets 88, the reaction liquid in this case serving as condensation liquid so that steam entrained in the gas stream 76 is separated on surfaces of the liquid jets 88, and this steam is then passed through the liquid jets 88 into the bath 100 in the collecting basin 98, said condensation liquid then entering the bath 62 via the feed duct 102 as the actual reaction liquid in order to wet the reaction discs 66 there.

Hence, with this guidance of the reaction liquid there is the advantage that it initially acts as condensation liquid in its freshly cooled state, whereby steam condenses out of the current 76 of the excited oxygen, then enters the bath 62, the reaction discs 66 are wetted and cooled there in order to absorb the heat forming during the chemical reaction, and is subsequently prepared in the preparation unit 40, both with respect to its chemical composition and with respect to its temperature, in which case because of the fact that water is formed as reaction product in the chemical reaction, the preparation unit 40 must in any case remove water from the reaction liquid so that the water additionally brought into the steam trap 20 as a result of condensation of steam may also be removed therefrom without any problem.

Figure 3:
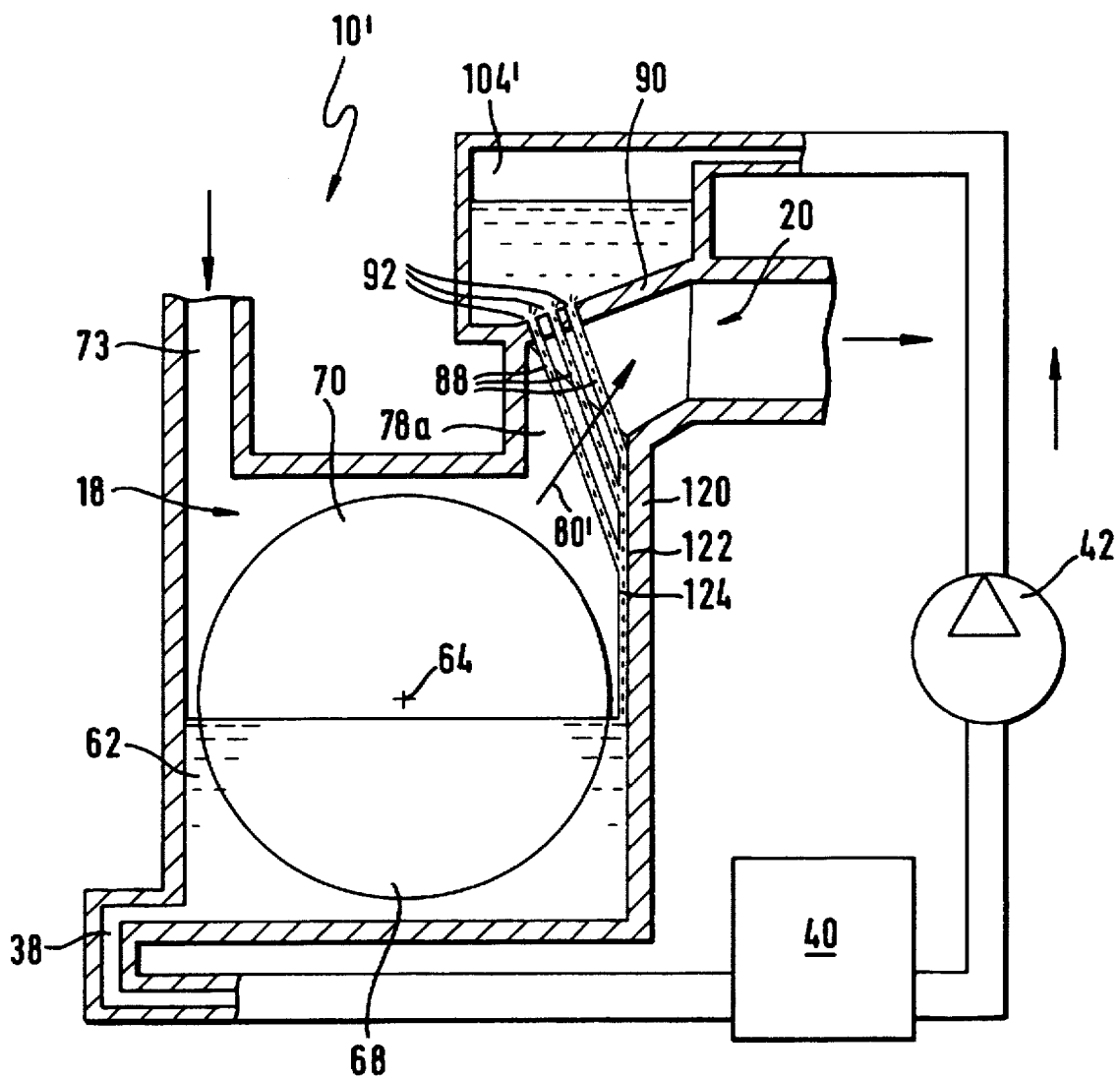
FIG. 3 is a schematic representation similar to FIG. 2 of a second embodiment of an oxygen generator according to the invention.

In a second embodiment of an oxygen generator 10' according to the invention and shown in FIG. 3, those parts which are identical to those of the first embodiment have been given the same reference numbers, and therefore reference may be made with respect to them to the statements relating to the first embodiment.

In contrast to the first embodiment, the arrangement of the liquid jets 88 in the second embodiment 10' is such that they pass through the section 78a of the discharge duct 78 and thus strike against a wall 120 of the housing 60 which merges into a side wall 122 defining the reaction chamber 74, the wall 120 of the section 78a being inclined so that the condensation liquid striking against it is directed over onto the side wall 122 and transferred from this into the bath 62.

The side wall 122 in this case is preferably that which diverts the current 76 of the excited oxygen in the direction of the discharge duct 78.

Thus, the provision of a collecting basin 98 and the feed duct 102 is unnecessary.

In addition, a liquid film 124 forming on the wall 120 and the side wall 122 also serves to form an additional cold liquid surface, on which steam entrained in the current 76 condenses.

In a third embodiment 10" of an oxygen generator according to the invention, the section 78a of the discharge duct 78 runs with its direction 80" approximately at an angle of 90° to the surface 82 of the bath 62 and the liquid jets 88, running obliquely to the direction 80", pass through the section 78a, in which case the nozzle openings 92 are arranged in a wall 126 which lies opposite wall 120 and itself defines the storage container 104" arranged on a side of wall 126 opposite the section 78a.

A liquid film 122, which runs down on the wall 120 and the side wall 122 and extends as far as the bath 62, is also formed in this embodiment and likewise forms a cold liquid surface for the additional separation of steam from the current 76.

Figure 4:
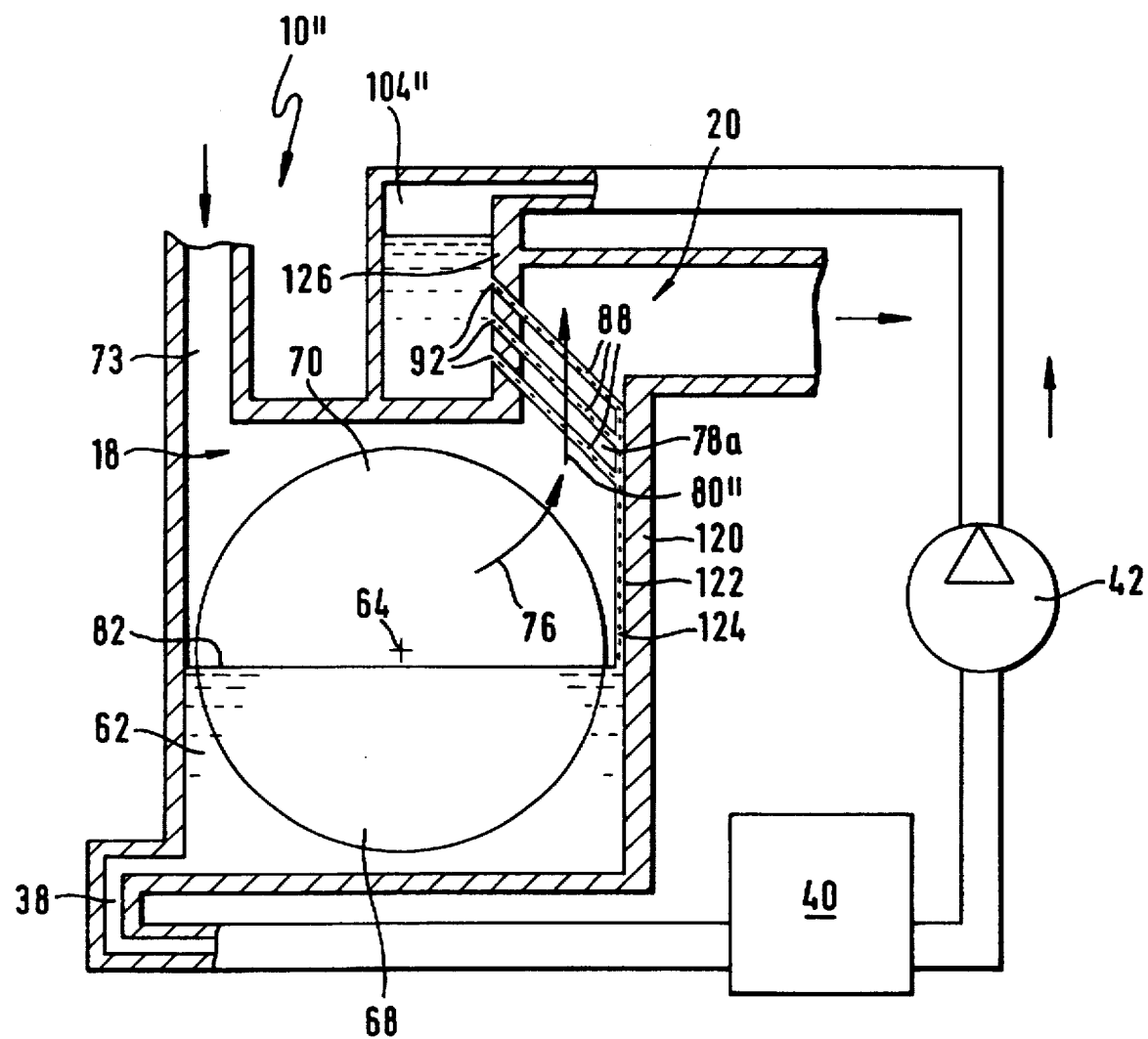
FIG. 4 is a schematic representation similar to FIG. 2 of a third embodiment of an oxygen generator according to the invention.
Figure 5:
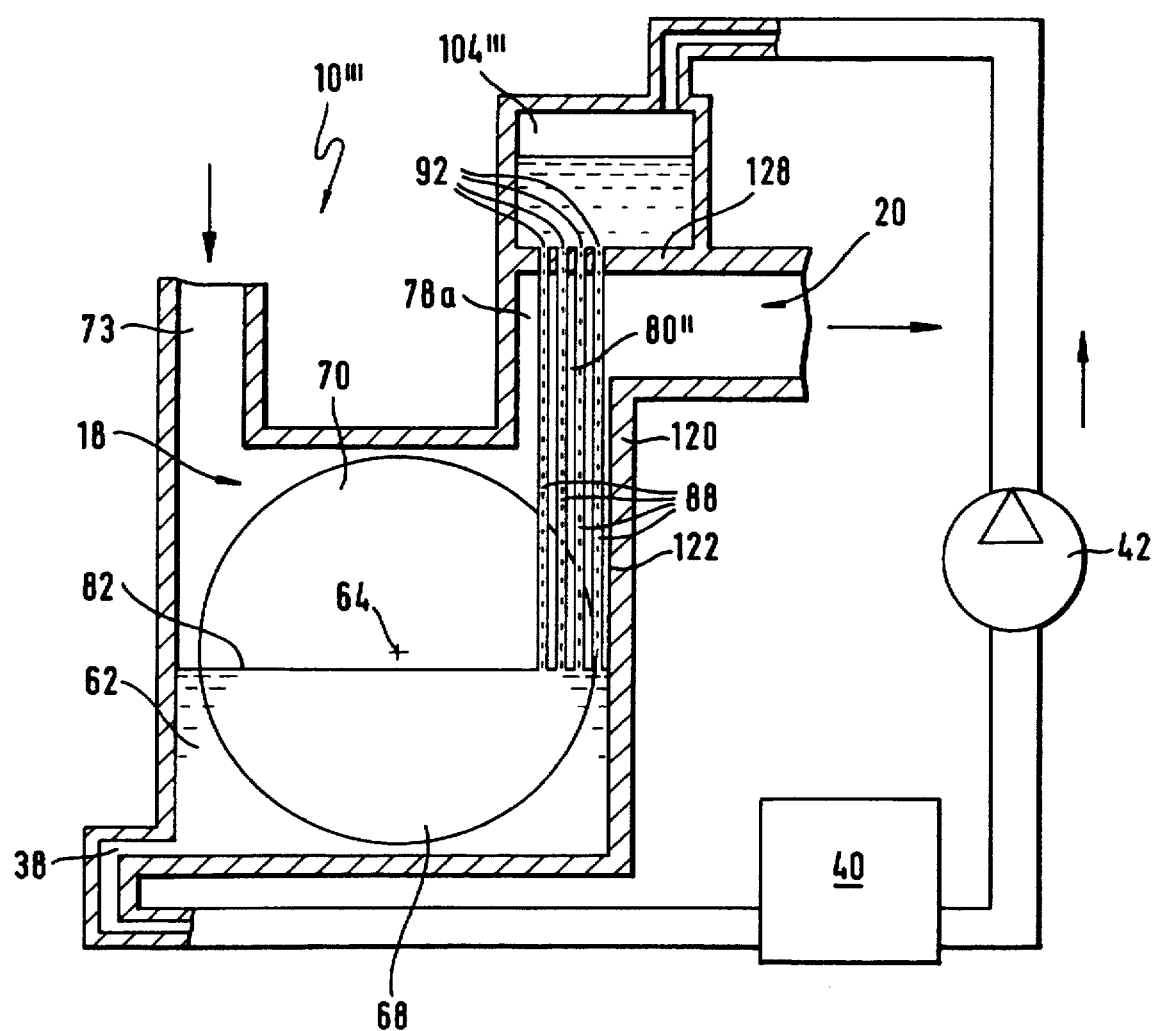
FIG. 5 is a schematic representation similar to FIG. 2 of a fourth embodiment of an oxygen generator according to the invention.

In a fourth embodiment of an oxygen generator 10'" according to the invention and shown in FIG. 5, the section 78a of the discharge duct 78 runs in the same direction as in the third embodiment shown in FIG. 4; however, the liquid jets 88 pass through the section 78a parallel to direction 80", in which case the nozzle openings 92 are arranged in a deflection wall 128 of the discharge duct 78 running transversely to direction 80".

The liquid jets 88 do not in this case strike against the wall 120 bordering section 78a or against the side wall 122 defining the reaction chamber 74, but run directly up to the surface 82 of the bath 62 and pass directly into this, in which case the liquid jets 88 at the same time still contribute partially to wetting the reaction discs 66 in the reaction chamber 74.

The statements in conjunction with the first and second embodiments are referred to here with respect to those features of the third and fourth embodiment not expressly described.

Figure 6:
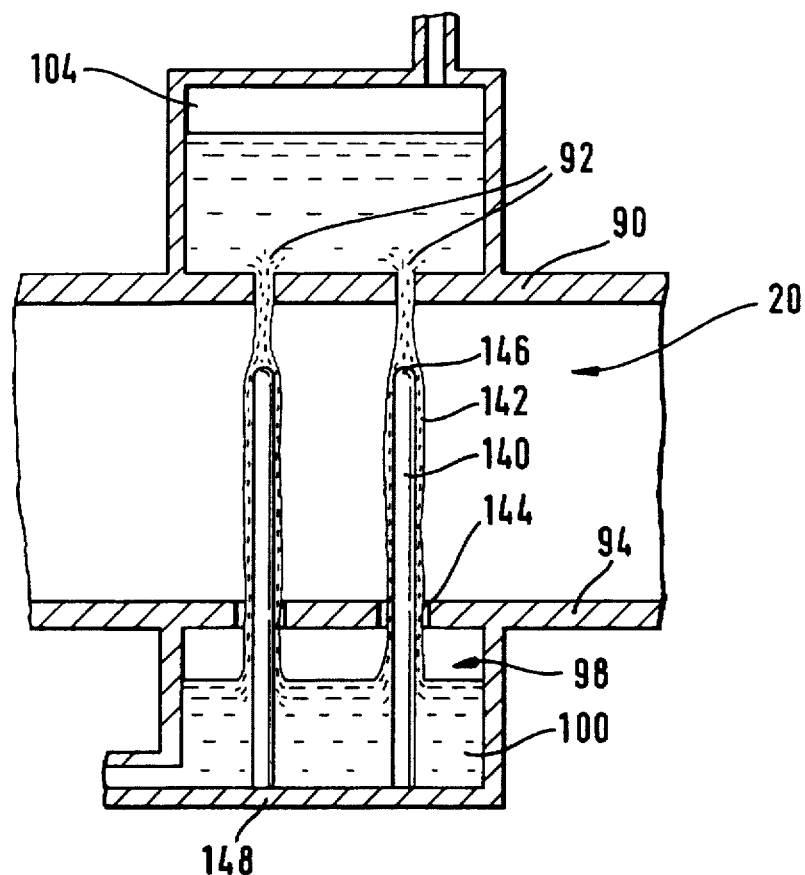
FIG. 6 is a schematic representation similar to FIG. 2 of a fifth embodiment of an oxygen generator according to the invention.
Figure 7:
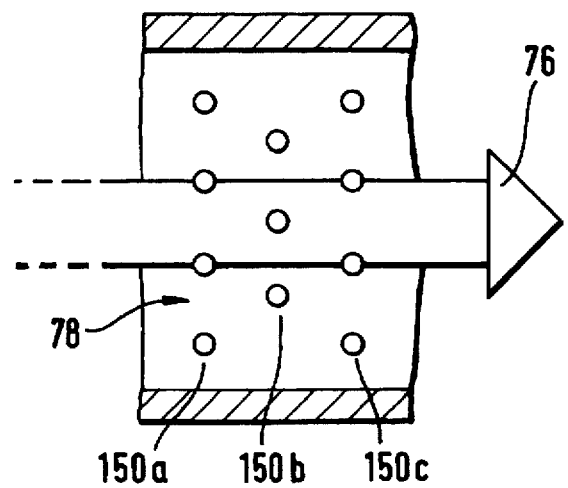
FIG. 7 is a schematic representation of liquid jets arranged in rows along line 7—7 in FIG. 2.

As an alternative to the homogeneous liquid jets described in the previous embodiments, which extend in particular continuously through the condensation chamber 86, i.e. without separating and in particular without forming drops or droplets, a further possibility illustrated in FIG. 6 envisages forming a liquid surface for condensation of the steam as a result of the condensation liquid flowing over a guide element 140 and thus forming a liquid film 142 on this guide element 140. In this case, this guide element 140 may be a guide bar, as shown in FIG. 6, for example, which extends through an opening 144 in the lower wall 94 in the direction of the upper wall 90, when the condensation chamber 86 is arranged in section 78b of the discharge duct 78, and terminates at its upper end 140 at a short distance from the nozzle openings 92 so that liquid exiting from the nozzle opening 92 is distributed over the entire outer surface of the bar 140 as a liquid film 142, after it strikes against the upper end 146, and flows along said bar through the opening 144 into the collecting basin 98 arranged below this.

In this case, the bar 140 preferably extends from a base 148 of the collecting basin 98 through the bath 100 and then through the opening 144.

No further details have been given regarding the arrangement of the liquid jets 88 in association with the embodiments described so far.

These are preferably arranged in rows 150a, 150b and 150c extending over the entire width of the respective section of the discharge duct 78, said liquid jets being arranged in the individual rows 150a, 150b, 150c in such a way that they are staggered in relation to the respective nearest row 150b, 150c.

Moreover, the distance between the liquid jets is preferably arranged so that it amounts approximately to a single diameter to five times the diameter of the respective liquid jets 88.

The same conditions apply for the provision of guide elements 140 on which a respective liquid film 142 forms, in which case instead of using the diameter of the liquid jets 88 as diameter, the diameter of the guide element 140 with the liquid film 142 forming on it should be used.

No further details have been given thus far with respect to the diameter of the liquid jets 88 or of the guide elements 140 with the respective liquid film. Hence, it is possible to select diameters of equal size or of different size.

What is claimed is:

1. An oxygen-iodine laser having a laser resonator with a laser-active gas mixture of excited oxygen and iodine flowing therethrough, comprising:

a reaction unit in which a chemical reaction between a reaction liquid and a reaction gas occurs to generate a gas stream comprising excited oxygen and entrained steam;

a steam trap with a condensation chamber through which the gas stream flows;

said steam trap comprising cold surfaces for separating the steam from the gas stream by condensation;

said cold surfaces being formed by surfaces of a condensation liquid moving in the condensation chamber; and an iodine injector which injects iodine into the gas stream to generate the laser-active gas mixture.

2. An oxygen-iodine laser according to claim 1, wherein: the condensation liquid moves in the condensation chamber in at least one stream.

3. An oxygen-iodine laser according to claim 1, wherein: the condensation liquid moving through the condensation chamber is performing a relative movement with respect to the gas stream moving through the condensation chamber.

4. An oxygen-iodine laser according to claim 3, wherein: the condensation liquid moves through the condensation chamber in a direction which is different than a direction in which the gas stream moves through the condensation chamber.

5. An oxygen-iodine laser according to claim 1, wherein: the condensation liquid flows through the condensation chamber in a plurality of jet streams.

6. An oxygen-iodine laser according to claim 5, wherein: the jet streams are substantially coherent.

7. An oxygen-iodine laser according to claim 1, wherein: the condensation liquid is guided through the condensation chamber substantially without forming droplets.

8. An oxygen-iodine laser according to claim 1, wherein: said condensation chamber comprises wall surfaces; and the condensation liquid flows as a liquid film over the wall surfaces and is guided thereby.

9. An oxygen-iodine laser according to claim 8, wherein: the wall surfaces are constructed so that they form spaces through which the gas stream passes.

10. An oxygen-iodine laser according to claim 8, wherein: the wall surfaces are formed by guide elements.

11. An oxygen-iodine laser according to claim 1, wherein: the surfaces of the condensation liquid are formed by a plurality of streams which are spaced apart from one another in at least one row.

12. An oxygen-iodine laser according to claim 11, wherein: the surfaces of the condensation liquid are arranged in a plurality of consecutive rows.

13. An oxygen-iodine laser according to claim 12, wherein: the surfaces of the condensation liquid are arranged in the plurality of consecutive rows staggered in relation to one another.

14. An oxygen-iodine laser according to claim 1, wherein:

said reaction unit comprises a discharge duct for discharging the gas stream; and the condensation chamber is arranged in the discharge duct.

15. An oxygen-iodine laser according to claim 1, wherein:

said reaction unit comprises a reaction chamber in which the chemical reaction occurs; and the condensation chamber essentially directly adjoins the reaction chamber.

16. An oxygen-iodine laser according to claim 1, wherein:

the condensation liquid passes through a circulation system.

17. An oxygen-iodine laser according to claim 16, wherein:

the circulation system is provided with a cooling system for cooling the condensation liquid.

18. An oxygen-iodine laser according to claim 16, wherein:

the circulation system comprises a separator for separating water from the condensation liquid.

19. An oxygen-iodine laser according to claim 1, wherein:

the condensation liquid is formed from the reaction liquid of the reaction unit by circulating the reaction liquid from the reaction unit to the condensation chamber.

20. An oxygen-iodine laser according to claim 19, wherein:

the reaction liquid is removed from the reaction unit and fed to a preparation unit to obtain a prepared reaction liquid; and the prepared reaction liquid from said preparation unit is then fed to the steam trap for use as the condensation liquid thereat.

21. An oxygen-iodine laser according to claim 19, wherein:

the reaction liquid which is circulated from the reaction unit to the condensation chamber is returned to the reaction unit after passing through the steam trap.

22. An oxygen-iodine laser according to claim 1, wherein:

a ratio of an area of active cold surfaces to a volume in the steam trap is lower than a ratio of active surfaces to a volume in the reaction unit.

23. An oxygen-iodine laser according to claim 1, wherein:

said reaction unit comprises a reaction chamber in which the chemical reaction occurs; and a volume of the condensation chamber is less than approximately one third of a volume of the reaction chamber.

24. A steam trap for removing steam which is entrained in a gas mixture for use in a laser resonator, comprising:

a condensation chamber for receiving said gas mixture from a reaction chamber;

said gas mixture flowing in said condensation chamber in a flow path;

said condensation chamber comprising an inlet for receiving a condensation liquid and means for injecting said condensation liquid into the flow path of the gas mixture in at least one stream;

said flow path of said gas mixture interacting with said at least one stream to cause the entrained steam to condense, thereby separating said entrained steam from said gas mixture; and said gas mixture being provided to said laser resonator after interacting with said at least one stream.

25. The steam trap of claim 24, wherein:

the injected condensation liquid is gravity fed into the flow path of the gas mixture.

* * * * *